United States Patent [19]
Goldbach et al.

[11] Patent Number: 5,190,803
[45] Date of Patent: Mar. 2, 1993

[54] STRUCTURAL SHELL WITH REINFORCING RIBS CONNECTED VIA PERFORATIONS

[75] Inventors: Hubert Goldbach, Ratingen; Boris Koch, Wermelskirchen, both of Fed. Rep. of Germany

[73] Assignee: Bayer Aktiengesellschaft, Fed. Rep. of Germany

[21] Appl. No.: 650,746

[22] Filed: Feb. 5, 1991

Related U.S. Application Data

[63] Continuation of Ser. No. 434,433, Nov. 13, 1989, abandoned.

[30] Foreign Application Priority Data

Nov. 25, 1988 [DE] Fed. Rep. of Germany ....... 3839855

[51] Int. Cl.$^5$ ............................................... B32B 3/24
[52] U.S. Cl. .................................. 428/138; 428/119; 428/120; 428/139; 428/182; 428/183; 428/99; 428/133; 428/132; 428/140; 428/83; 428/122; 428/223; 428/177; 264/261; 264/279; 52/309.16
[58] Field of Search ............... 428/119, 120, 139, 182, 428/183, 138, 99, 133, 132, 140, 83, 122, 223, 177; 52/309.16; 264/261, 279

[56] References Cited

U.S. PATENT DOCUMENTS

| | | | |
|---|---|---|---|
| 3,367,809 | 2/1968 | Soloft | 156/73.1 |
| 3,448,550 | 6/1969 | Herr et al. | 52/309.16 |
| 3,462,330 | 8/1969 | Greig et al. | 428/183 |
| 3,470,598 | 10/1969 | Berthelsen | 52/309.16 |
| 3,732,138 | 5/1973 | Almog | 428/120 |
| 3,770,545 | 6/1973 | Jackson | 156/221 |
| 3,905,171 | 9/1975 | Carqill et al. | 428/120 |
| 4,004,774 | 1/1977 | Houston | 428/139 |
| 4,139,664 | 2/1979 | Wenrick | 428/133 |
| 4,315,964 | 2/1982 | Ozaki et al. | 428/182 |

FOREIGN PATENT DOCUMENTS

| | | | |
|---|---|---|---|
| 1956826 | 5/1971 | Fed. Rep. of Germany . | |
| 1784185 | 2/1972 | Fed. Rep. of Germany . | |
| 2029994 | 10/1970 | France | 428/139 |
| 555415 | 8/1943 | United Kingdom | 428/133 |
| 2028233 | 12/1979 | United Kingdom | 428/120 |

*Primary Examiner*—Ellis P. Robinson
*Assistant Examiner*—William P. Watkins, III
*Attorney, Agent, or Firm*—Connolly & Hutz

[57] ABSTRACT

The manufacture of lightweight components having high strength properties can be improved in that a bowl-shaped shell (1) has reinforcing ribs (3) made from injected-on plastic in its interior (2) which are connected to the shell (1) at discrete connecting points (11) via perforations (12) in the shell (1), through which the plastic passes, extending beyond the surfaces of the perforations (12).

4 Claims, 2 Drawing Sheets

STRUCTURAL SHELL WITH REINFORCING RIBS CONNECTED VIA PERFORATIONS

CROSS-REFERENCE TO RELATED APPLICATION

The present application is a continuation of application Ser. No. 07/434,433 filed Nov. 13, 1989 (now abandoned).

The invention relates to a lightweight component made from a bowl-shaped shell, the interior of which has reinforcing ribs which are firmly connected to the shell.

Lightweight components of this type, in appropriate design, are used for vehicle seats, supporting elements for office machines, construction elements for decorative purposes and the like.

Up to now they have been manufactured from metal, wherein, for example a deep-drawn shell made from steel plate or aluminum plate has been welded, riveted or screwed to reinforcing ribs (DE-OS 1,704,387). On the other hand, lightweight components of this type have been manufactured in one piece from plastic by injection molding. However, it has been shown that pure plastic parts at acceptable dimensioning of the cross-sections, have lower strength and in particular lower rigidity than comparable lightweight components made from metal.

The object is to provide a lightweight component which can be manufactured more simply and has good strength and rigidly properties.

This object is achieved in that the reinforcing ribs consists of injected-on plastic and are connected to the shell at discrete connecting points via perforation in the shell through which the plastic passes, extending beyond the surfaces of the perforations.

This enables a thin-walled shell to be used which can be manufactured from sheet metal using the deep-draw process. Untreated, zinc-coated steel sheets and/or steel sheets provided with a primer and optionally adhesion-promoter, untreated, anodised aluminium sheets and/or aluminium sheets provided with a primer and optionally an adhesion-promoter are particular suitable. However, plastic sheets shaped by hot pressing can also be used for the shell and they consist of thermoplastics having glass-fiber mats or synthetic-fiber mats for reinforcements. Partially crystalline plastics, such as glass-fiber reinforced polyamide 6, polyamide 6,6, polybutylene terephthalate, polyphenylene sulphide or propylene are particularly suitable as plastics for injecting on the reinforcing ribs.

Particularly suitable uses for lightweight components of this type are structural parts for motor vehicle doors, bumper supports, front and rear parts for cars, door sills, support frames for office machines and decorative elements which must have increased strength and rigidity.

These lightweight components can be manufactured by placing the shells pre-formed by deep-drawing or hot pressing in an injection mould having appropriately shaped mould cavity and injecting on the reinforcing ribs and optionally the reinforcements.

Surprisingly, it has been shown that, depending on the plastic, the buckling strength of the shell made from steel sheet can be increased to over 80% in this manner; the torsional rigidity can be increased by more than 10 times for V-ribbing and it rises still further for cross-ribbing. The intrinsically brittle fracturing behaviour of thermoplastics reinforced by short glass fibers is positively influenced by the ductile behaviour of the metal parts so that there is no danger of the plastic splintering. Similar increases in strength can be achieved when using plastic sheets for the shell. The linear coefficient of thermal expansion is essentially determined by the metal when using a metallic shell.

According to a particular embodiment, the anchors consist of beads which are either directed into the ribs or are directed way from them.

These beads can have a round, oblong or even irregular cross-section.

It is particularly advantageous to combine beads with perforation.

All these embodiments are characterised by particularly good absorption of shear stresses.

The shell preferably at least partially has a covering layer which consists of the same plastic as the reinforcing ribs.

The shell can be provided in this manner with an optically appropriate surface so that is has, for example a certain color and/or structural surface (grain, pattern). Such a covering layer serves particularly also as corrosion protection for a metal shell and is to be recommended for all surfaces which are particularly at risk.

It is particularly advantageous if the edges of the perforations have deformations.

The surface of the shell is thus enlarged precisely in this critical region. Bead-shaped indentations of the edges of the perforations are suitable as deformations. However, the edges can also additionally be cut out and the resulting tongues can be bent or twisted, this enable particularly firm connections to be made. Deformations of this type improve the flow of force between shell and reinforcing ribs and other injected-on reinforcements. As a rule, the deformations are directed in to the interior of the shell because this shell can be provided with a smooth outer surface in the manner.

The reinforcing ribs preferably have a widened foot at the connection points with the shell.

The thus enlarged contact surfaces between shell and reinforcing ribs increases the adhesion and thus in particular the absorption of shear forces.

It is also particularly advantageous if the spaces remaining between the reinforcing ribs and the side walls of the shell have a trapezium-shaped cross-section instead of a pointed triangular cross-section.

On the one hand, the contact surfaces with the shell are thus increased, and on the other had the flow of force between the ribs is more favourable. The transition between the individual surfaces of the reinforcing ribs should be rounded to exclude notch effects.

The novel lightweight component is shown purely schematically in the drawing in several embodiments and is explained in more detail below.

Figure 1:
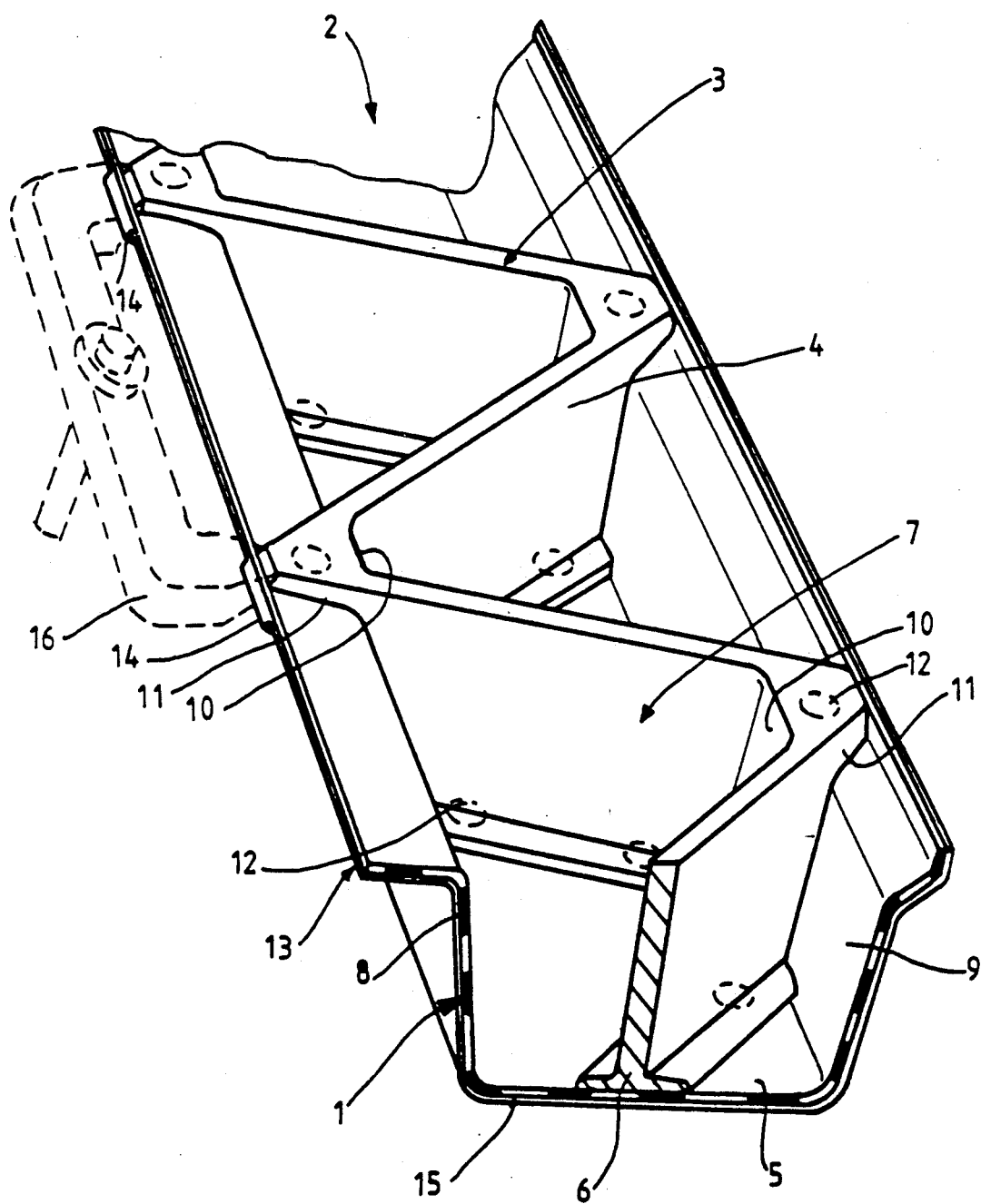
FIG. 1 shows a shell in the form of a longeron for a vehicle in spatial representation.

In FIG. 1 the lightweight component consists of a shell 1 in the form of a longeron 1 for a car. It consists of a deep-drawn steel plate which has been treated with an adhesion promoter. V-shaped reinforcing ribs 3 made from polyamide 6 having 30 wt. % glass-fiber content are provided in its interior 2. These reinforcing ribs 3 extend with a web 4 over the entire depth of the interior 2 and have a widened foot 6 towards the base 5 of the longeron 1. The reinforcing ribs 3 form trapezium-shaped spaces 7 with the shell 1, wherein connecting webs 10 made from the same plastic are present on the side walls 8, 9 of the longeron 1, which connecting webs 10 extend parallel to the side walls 8, 9 and are securely adhered to them, They have approximately the same strength as the reinforcing ribs 3. Anchors in the form of beads and perforations 12 shown by the dashed line are provided between the reinforcing ribs 3 and the longeron 1, the plastic on the outer side 13 passes through these perforations 12 and forms blocks 14 there. The outer side 13 is provided with a covering layer 15 of the same plastic. The sprue channel 16 of a mould not shown is represented by a dashed line to demonstrate the injection technique.

Figure 2:
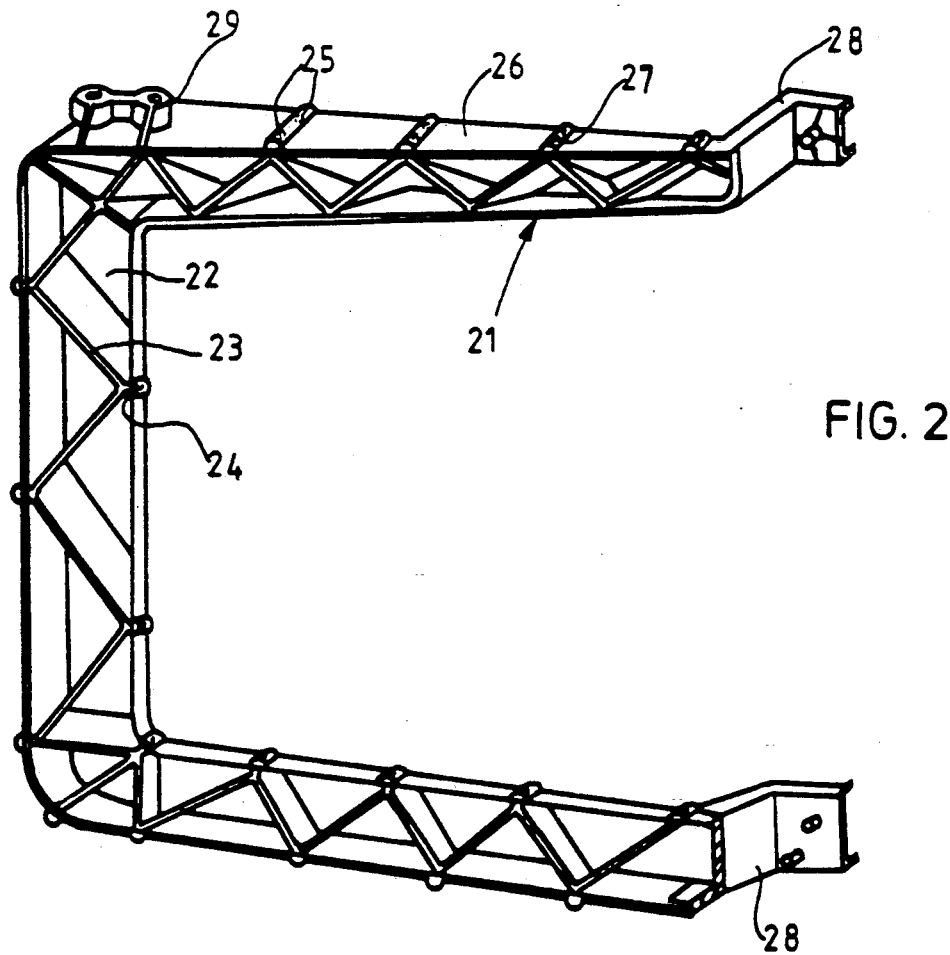
FIG. 2 shows a shell in the form of a support frame for an office machine in spatial representation.

In FIG. 2 the shell 21 consists of a plastic sheet shaped by hot pressing and made from polyamide having reinforcing glass fiber mat having a surface weight of 1950 g/m$^2$ at 1 mm sheet thickness and 78 wt. % glass content. Reinforcing ribs 23 made from polyamide 6,6 having a glass fiber content of 35 wt. % are arranged in the interior 22 of this shell 21. The shell 21 has deformations (beads) 25 shown as a dashed line at the connection points 24 between the shell 21 and the reinforcing ribs 23, the plastic of the reinforcing ribs 23 passes through these deformations (beads) 25 and from bulges 27 on the outer side 26. In addition, the connecting flange 28 and reinforcing eyes 29 made from the same plastic are injected on at the same time.

Figure 3:
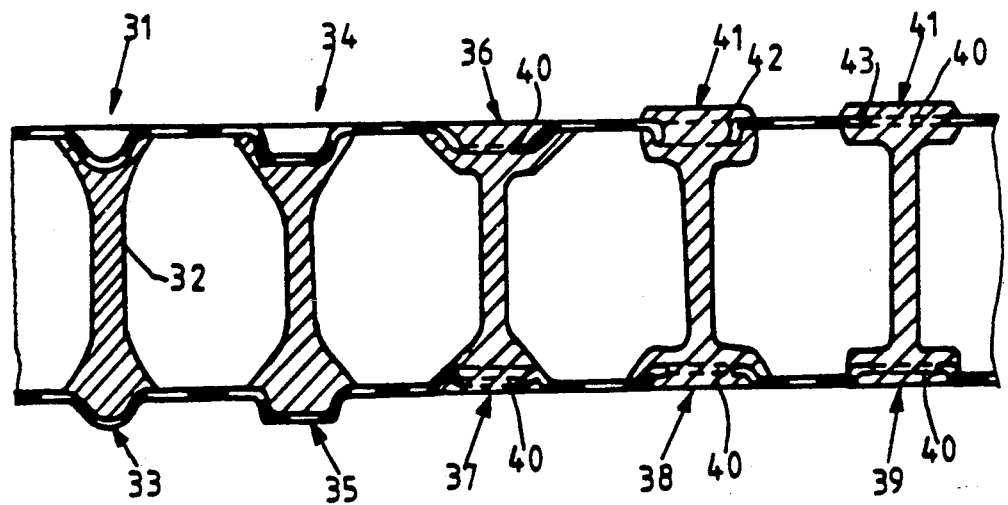
FIG. 3 shows a selection of various possible deformations of the edges of the perforation.

The different types of anchors 31 shown in FIG. 3 merely represent a particularly suitable selection from a number of further possibilities.

The anchor 31 consists of a deformation in the form of a semi-circular bead pointing into the rib 32. The anchor 33 also has the shape of a semi-circular bead, but points away from the rib 32.

The anchors 34 and 35 have the shape of cup-like beads. The anchors 36, 37, 38, 38 are also essentially cup-shaped, but additionally have perforations 40. The anchor 41 also consists of a perforation having a right-angled edge deformation 42. Finally, the anchor 43 only has one perforation 40.

We claim:

1. A lightweight structural component having high strength and rigidity properties comprising a shell having a hollow interior, and an inner surface reinforcing ribs of thermoplastic material injected onto the inner surface and contained within the hollow interior adhering to the shell where the ribs engage the inner surface of shell and also at a plurality of connecting points, a plurality of perforations in the shell at the connecting points through which thermoplastic material of the reinforcing ribs passes and extends beyond the perforation to anchor the reinforcing ribs to the shell, and each of the perforations having deformed edge portions embedded in the thermoplastic material of the reinforcing ribs to assist in anchoring the reinforcing ribs to the shell.

2. A light weight structural component as in claim 1 including a layer of thermoplastic material at least partially covering the shell.

3. A lightweight structural component as in claim 1 wherein at least some of the reinforcing ribs have widened foot portions engaging the shell.

4. A lightweight structural component as in claim 2 wherein the ribs include enlarged reinforcements in which the deformed edge portions are embedded.

* * * * *

UNITED STATES PATENT AND TRADEMARK OFFICE
CERTIFICATE OF CORRECTION

PATENT NO. : 5,190,803
DATED : March 2, 1993
INVENTOR(S) : Hubert Goldbach, et. al.

It is certified that error appears in the above-indentified patent and that said Letters Patent is hereby corrected as shown below:

Column 1, line 62, "the" should read -- other --.

Column 2, line 51, "had" should read -- hand --

Column 3, line 30, "from" should read -- forms --.

Column 4, line 6, "38" should read -- 39 --.

Signed and Sealed this

Thirtieth Day of November, 1993

Attest:

BRUCE LEHMAN

*Attesting Officer*     *Commissioner of Patents and Trademarks*